Oct. 9, 1928.

F. B. KAUFMAN

BED

Original Filed Dec. 30, 1925  9 Sheets-Sheet 1

1,687,338

Oct. 9, 1928.
F. B. KAUFMAN
BED
1,687,338
Original Filed Dec. 30, 1925    9 Sheets-Sheet 2
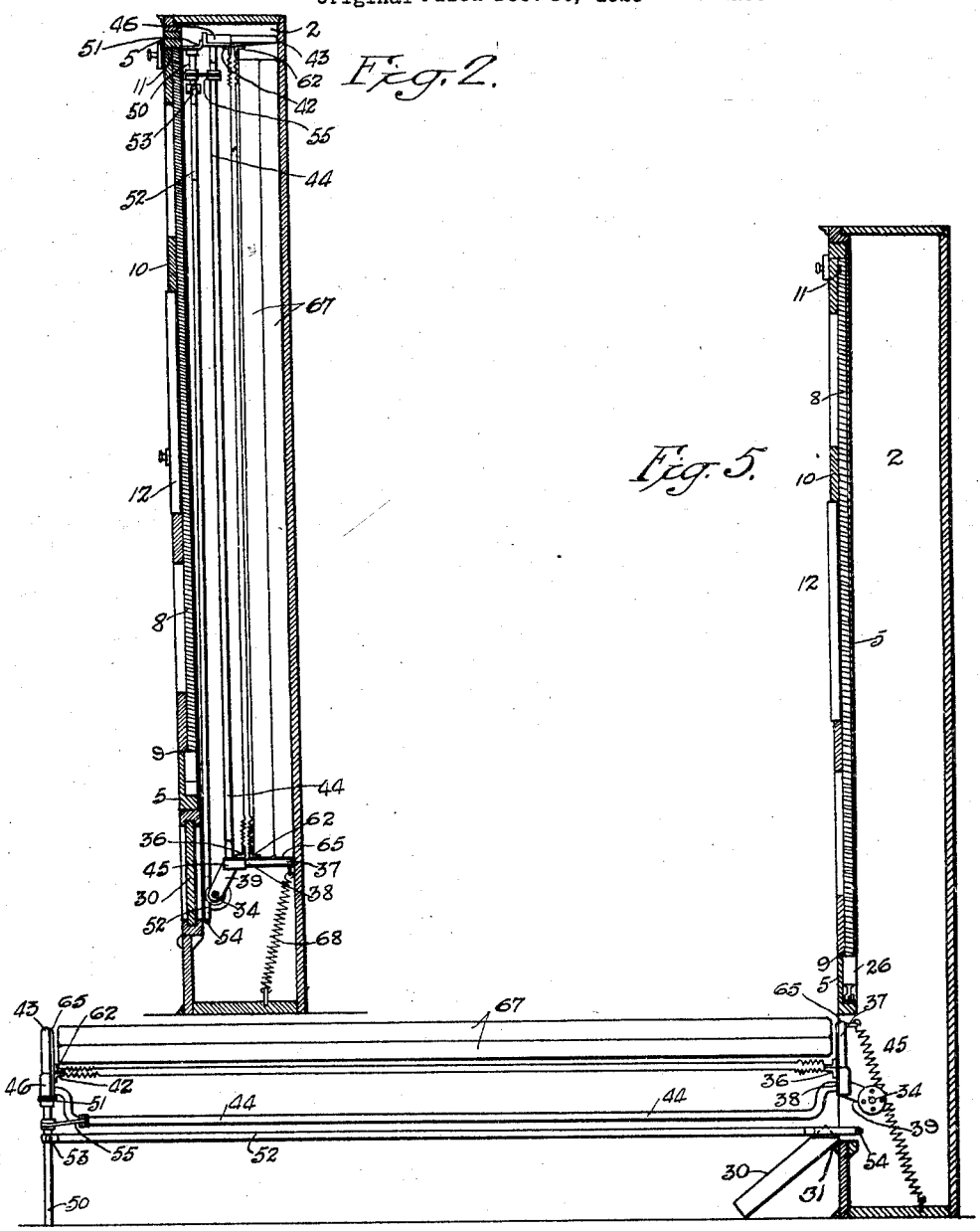
Inventor:—
Frederick B. Kaufman,
by his Attorneys
Howson & Howson

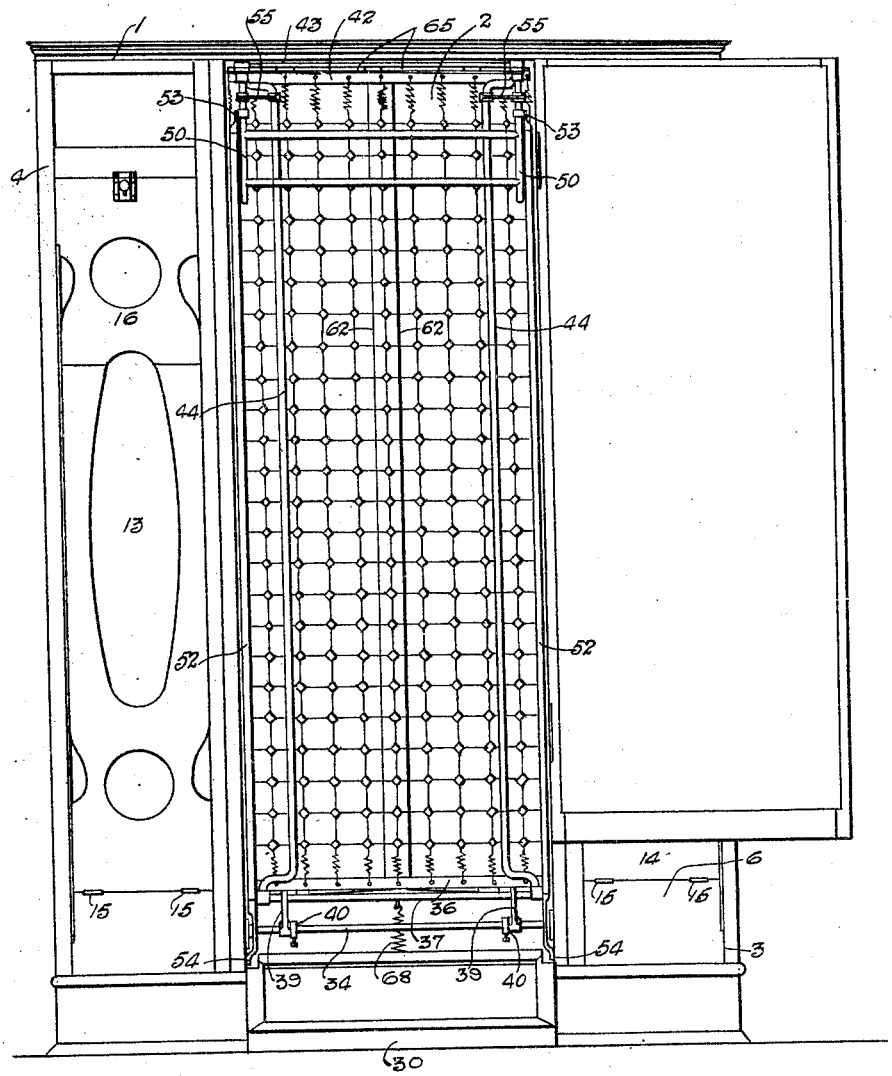

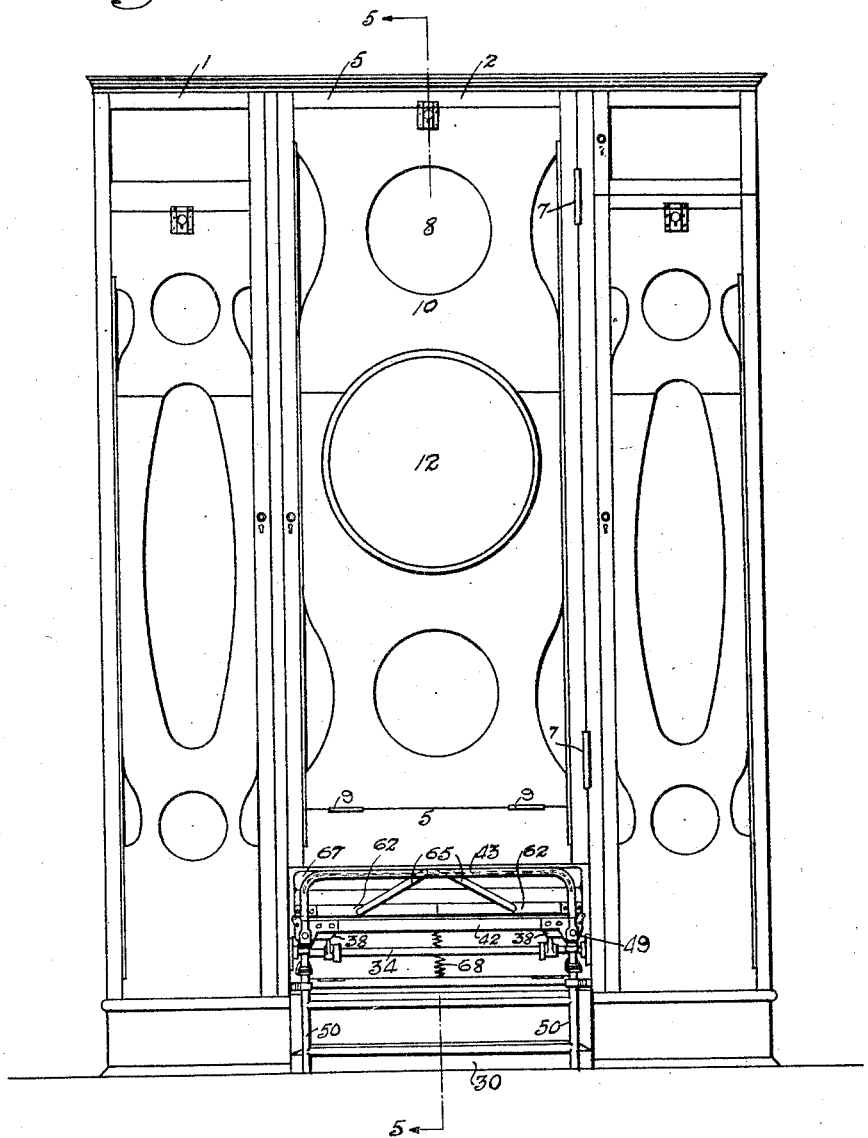

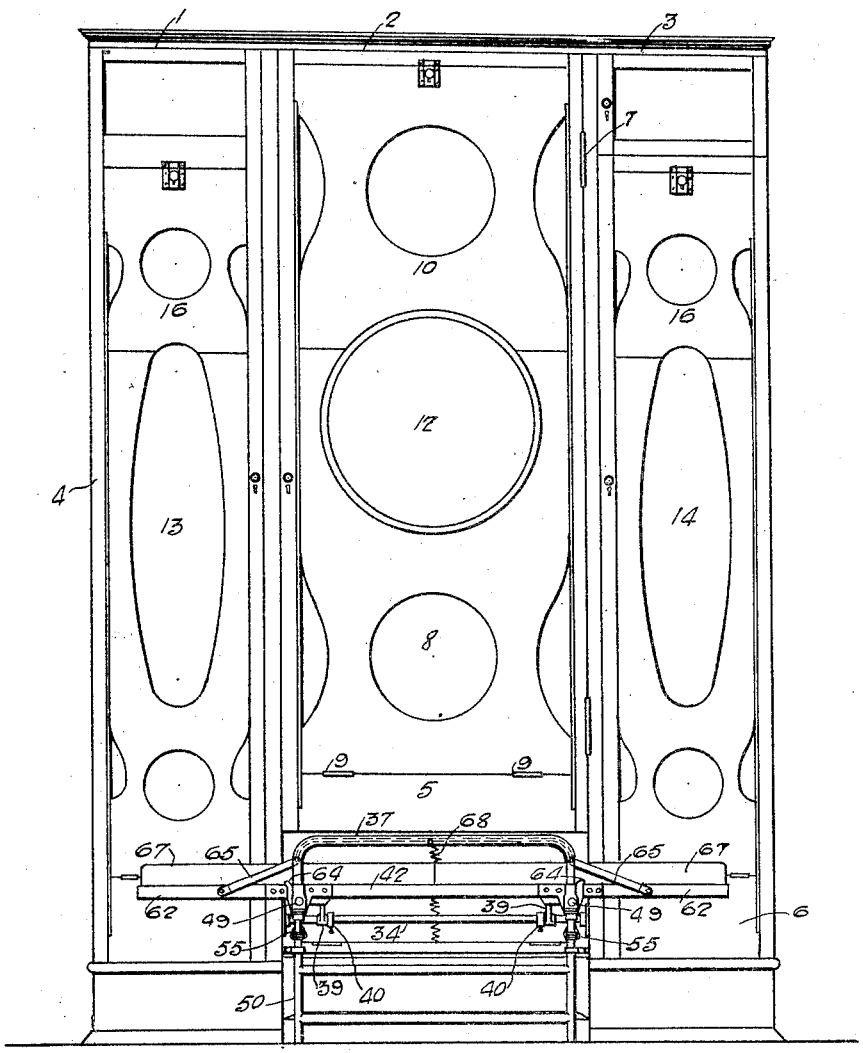

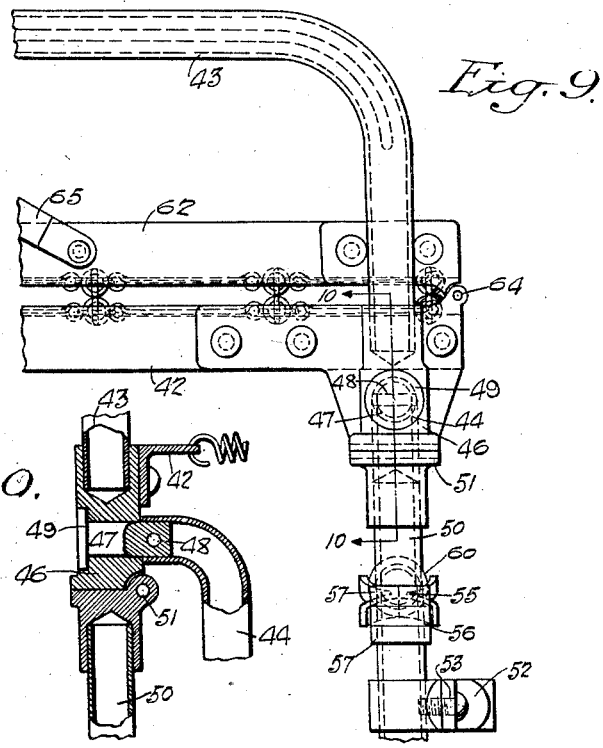
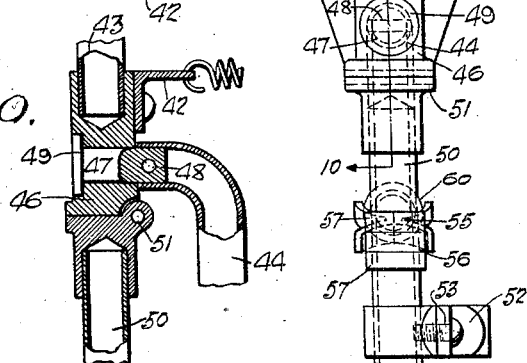
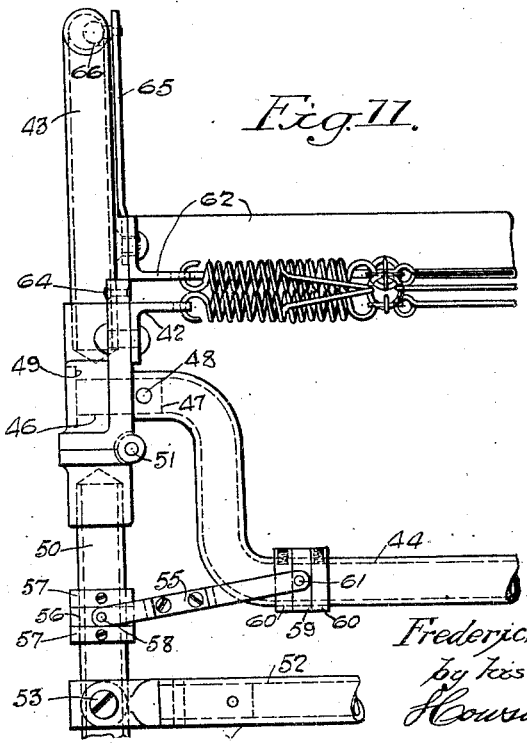

Oct. 9, 1928. 1,687,338

F. B. KAUFMAN

BED

Original Filed Dec. 30, 1925 9 Sheets-Sheet 8

Inventor:-
Frederick B. Kaufman,
by his Attorneys,
Howson & Howson

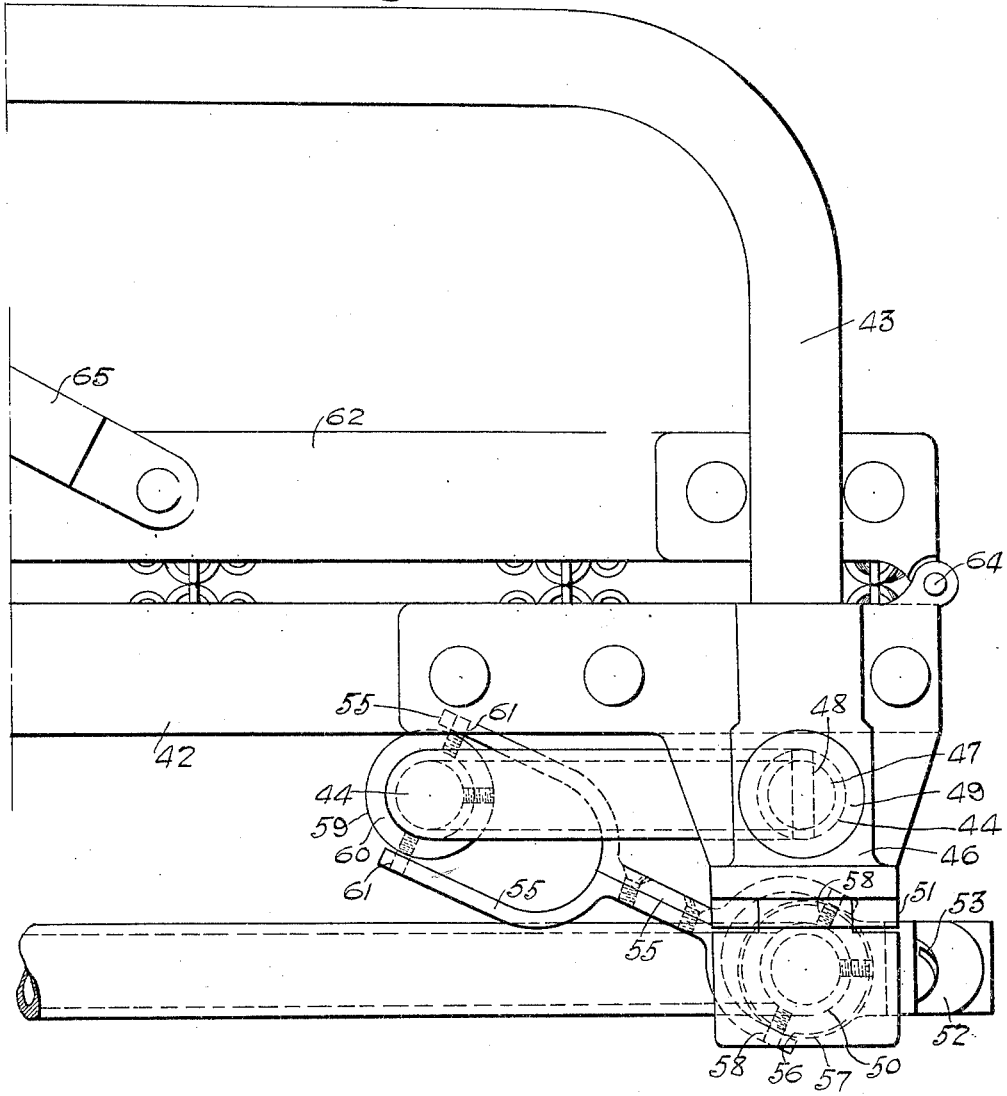

Patented Oct. 9, 1928.

1,687,338

UNITED STATES PATENT OFFICE.

FREDERICK B. KAUFMAN, OF PHILADELPHIA, PENNSYLVANIA.

BED.

Original application filed December 30, 1925, Serial No. 78,451. Divided and this application filed July 29, 1927. Serial No. 209,260.

This invention relates to cabinets of the type adapted to hold, in compact form, various household appurtenances, such as a table and seats, bed, toilet articles, ironing board and the like, whereby the latter, during the periods when they are not in use, may be folded to leave the floor space clear, and this application is a division of another application filed by me on December 30, 1925, Serial No. 78,451.

In general, the invention resides in the arrangement of the varied elements in the cabinet whereby such elements may be used selectively, and at will, without interference with each other.

The invention further comprehends certain novel and improved structural features of the various elements, as hereinafter set forth and claimed, and as illustrated in the attached drawings, in which Figure 1 is a front elevation of a cabinet constructed according to my invention, with all the associated elements enclosed;

Fig. 2 is a vertical section on the line 2—2 of Fig. 1;

Fig. 3 is a view of the cabinet showing the center panel thereof swung outwardly to give access to the elements which occupy the middle compartment;

Fig. 4 is a view similar to Fig. 3, showing the elements which occupy the middle compartment of the cabinet swung down to operative position, the doors of the cabinet being shown closed;

Fig. 5 is a vertical section taken on the line 5—5 of Fig. 4;

Fig. 6 is a front elevation of the cabinet showing the bed, which is mounted in the middle compartment, in operative position with its side wings folded outwardly to give the bed its maximum width;

Fig. 9 is a fragmentary elevation of one corner of the front of the bed when the latter is in operative position;

Fig. 10 is a section on the line 10—10 of Fig. 9;

Fig. 11 is a fragmentary side elevation of the forward end of the bed when the latter is in operative position;

Fig. 14 is a plan of the outer end of the bed when the latter is in elevated, or inoperative position.

Figure 1:
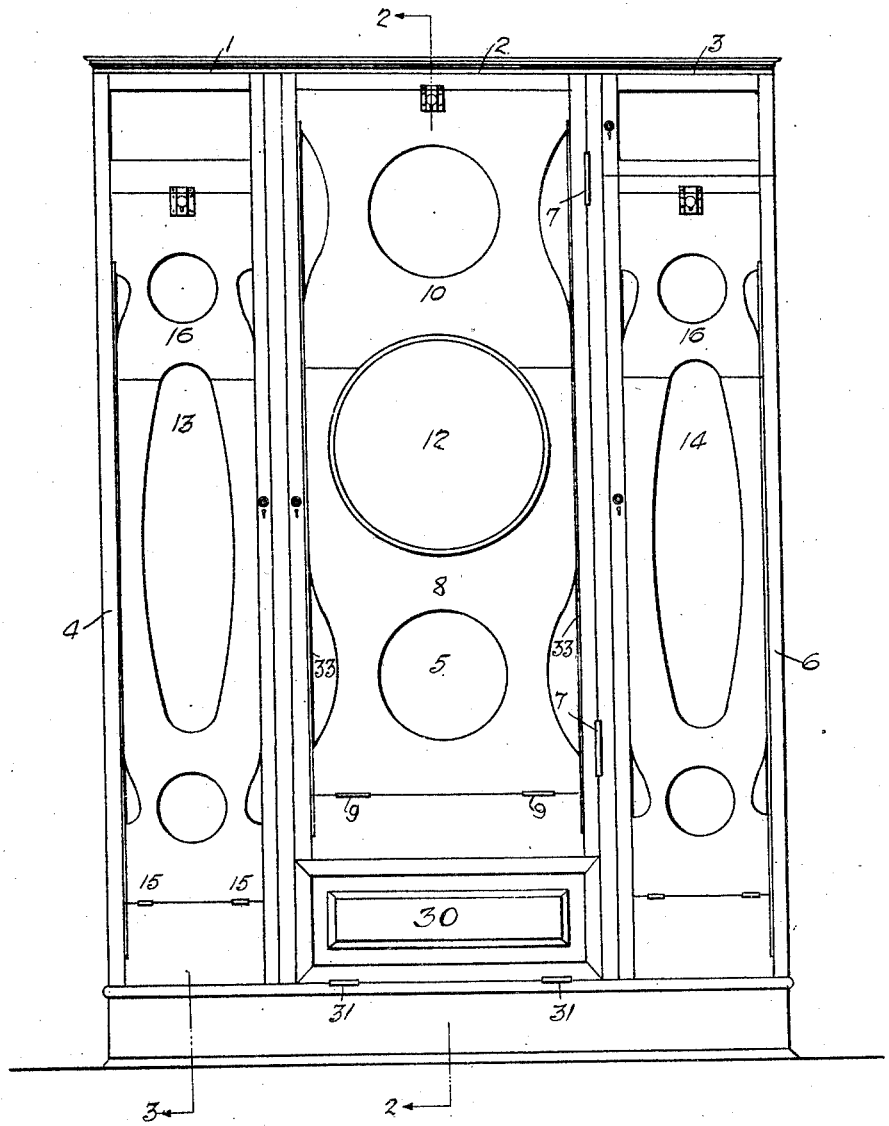

Referring to the drawings, the cabinet, in the form illustrated, comprises three vertical compartments 1, 2 and 3, closed by doors 4, 5 and 6.

The doors 4 and 6 of the two outer compartments are hinged at their vertical edges so as to swing outwardly and away from the central portion of the cabinet.

The door 5 is connected to the right vertical edge of the compartment 2 by hinges 7.

On the outer face of the door 5 is mounted a table 8. This table is adapted to be supported in a horizontal position by a leg 10 connected by means of hinges 11 to the outer or—in the elevated position—upper edge of the table.

The under side of the table 8, which is exposed when in the elevated or inoperative position, is so recessed in the upper portion that the leg 10, or the exposed face thereof, lies flush with the under surface of the table.

As shown in Fig. 1, the exposed portions of the table 8, in the elevated position, may be ornamented by means of panels, so as to present a uniform appearance tending to obscure the real nature of the exposed parts. In the present instance, I have illustrated a circular mirror 12 set in the under side of the table 8.

Seats 13 and 14 are respectively mounted in a similar manner on the doors 4 and 6 of the side compartments. These seats are supported at the inner edge by hinges 15, and have a leg 16 at their upper and outer edges.

Also, in this instance, the under surfaces of the seats 13 and 14 are recessed for the reception of the leg 16, when the seats are in the elevated or inoperative position.

The under sides of the seats are recessed and paneled in such manner as to provide a uniform and ornamental appearance, as illustrated in Fig. 1.

The middle compartment 2 houses a bed.

When the door 5 is opened the bed may be swung outwardly and downwardly around a transverse pivot bar 34.

The bar 34 is supported in the compartment 2 behind a door 30 pivotally secured by hinges 31 at its bottom edge to the frame of the cabinet.

In bringing the bed into operative position, the door 30 is swung downwardly at the same time that the door 5 is swung open.

The bed comprises a rear frame piece 36; including a head bar 37. A bracket 38 is secured to the frame piece 36, at each side thereof. This bracket has an arm 39 which terminates in a bearing through which the rod 34 projects.

Collars 40 are provided on the rod 34. These collars have a set screw 41, whereby they may be secured to the rod 34 at the inside of the arms 39, to properly position the frame piece 36 transversely of the supporting bar.

The bed further comprises an outer frame piece 42 which includes a foot bar 43.

The frame piece 42 is connected with the rear frame piece 36 by means of side bars 44, one at each side, the ends of these bars being pivotally secured in the respective frame pieces on axes longitudinal of the bed.

Bearings 45 support the inner ends of the bars 44, while bearings 46 in the frame piece 42 support the outer ends of the bars.

In the present instance, the bars 44 are formed from piping and the journal member is constituted by a pin 47 passed through the bearings 45 and 46 from the outside and into the ends of the hollow bar 44.

Rivets or pins 48 are passed through the bars 44 and through the inner ends of the pins 47.

The outer ends of the pins 48 are provided with heads 49 which firmly secure the pins in the frame pieces and which accordingly are securely tied together and held rigidly in spaced relation by the side bars 44.

Figure 7:
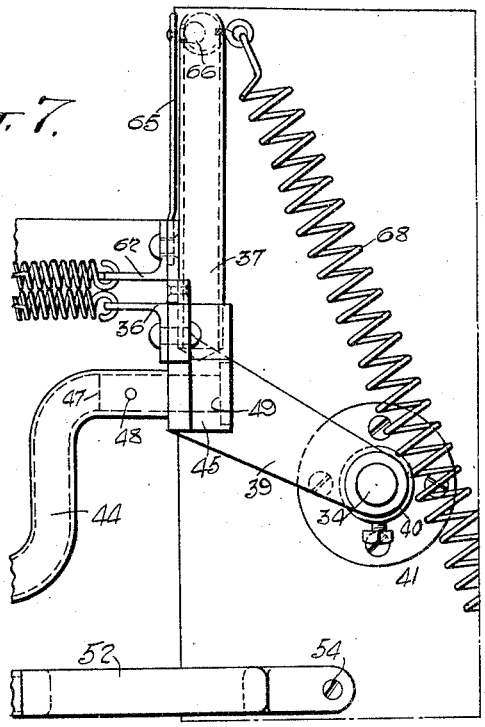
Fig. 7 is a fragmentary elevation of the rear portion of the bed as illustrated in Fig. 5, showing the details of the pivotal mounting of the bed in the cabinet.
Figure 8:
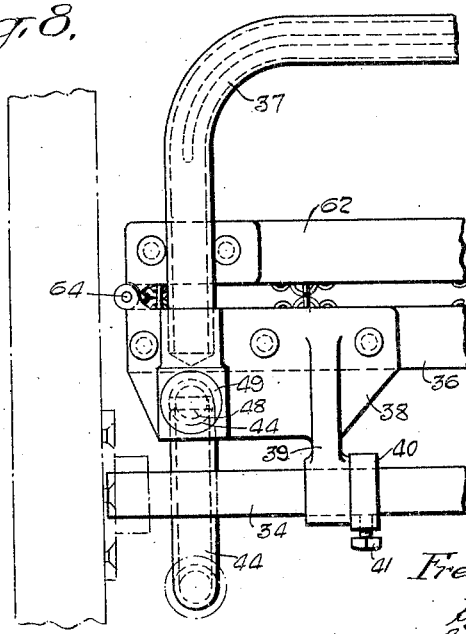
Fig. 8 is a fragmentary rear elevation showing a rear corner of the bed, and further illustrating the pivotal mounting.
Figures 12, 13:
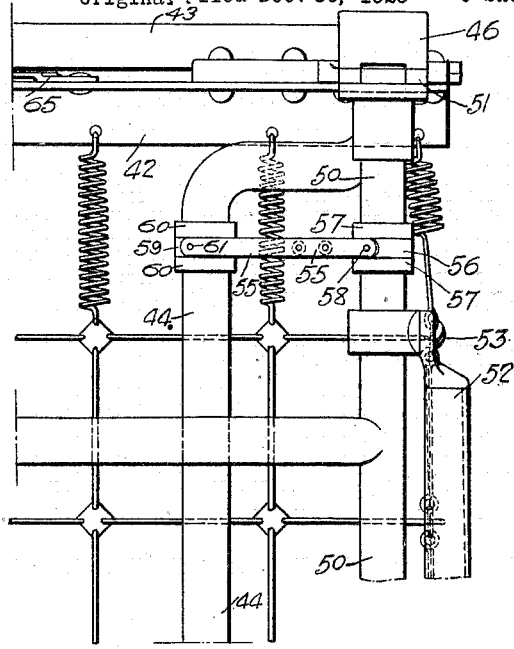
Fig. 12 is a front elevation of an outer corner of the bed when the latter is in elevated, or inoperative position.
Fig. 13 is a fragmentary side elevation of an outer corner of the bed when the latter is in elevated, or inoperative position.

This pivotal mounting or connection of the side bars 44 is provided so that the bars, which are offset at the ends, as illustrated in Figs. 5, 7 and 11 may, when the bed is in elevated position, as shown for example in Fig. 12, be turned back so as to lie substantially in the plane of the bed, thereby materially reducing the thickness of the bed when it is in the cabinet.

When in the operative position, however, as shown in Figs. 5, 7 and 11, the bars 44 occupy a position in a plane at right angles to the plane of the springs, with the result that the greater portion of the bars between the offset end portions is carried well below the springs, giving ample clearance for the latter.

The outer end of the bed, when in an operative position, is supported on legs 50 pivotally secured at each side of the frame piece 42, as indicated at 51 (Figs. 10 and 11).

The legs 50, when the bed is elevated are adapted to fold back to a plane paralleling the plane of the springs. This is automatically accomplished by means of rods 52, one of which is pivotally secured at 53 to each of the legs, the opposite ends of the rods being pivotally secured at 54 within the cabinet at a point below the transverse supporting bar 34, as shown in Fig. 7. The rods 52 also function as struts for maintaining the legs in the operative position and preventing accidental displacement thereof.

An operative connection is also established between the side bars 44 and the legs 50 whereby the rods 52 function also to swing the side bars on their pivots from the position paralleling the plane of the springs which they occupy when the bed is elevated to the position in a perpendicular plane occupied when the bed is in the lowered or operative position. This connection is in the form of a link 55, having bifurcated ends.

One of the bifurcated ends of the link 55 embraces a collar 56 which is loosely mounted on the leg 50 between two fixed sleeves 57. The sleeves retain the collar 56 in predetermined position longitudinally of the leg, while permitting its free rotation about the latter.

Studs 58 threaded into opposite sides of collar 56 constitute trunnions which extend through suitable apertures in the ends of the said link 55 and thereby provide what, in effect is, a universal joint between the link and the leg 50.

A similar connection is established through a collar 59 on the side bar 44. This collar is freely rotatable about the side bar, but is prevented from moving longitudinally thereof by fixed sleeves 60.

This end of the link 55 is connected with the collar 59 through trunnions 61 in a manner similar to that previously described in connection with the collar 56.

These two universal connections provide for the complicated relative movement between the side bars 44 and the legs 50 as they move from the positions which they assume when the bed is elevated to those which they occupy when the bed is lowered.

It will be apparent that since the legs are automatically moved to their proper relative positions by the rods 52, the connection between the legs and the respective side bars 44 through the link 55 will result in a similar automatic movement of the side bars into their different positions by the mere act of lowering or raising the bed.

In Fig. 11 the various parts described above are shown in the positions assumed when the bed is lowered, while in Fig. 12 the parts are shown in the relative positions assumed when the bed is raised.

The bed comprises, besides the central spring, a spring carrying sub-frame 62 at each side.

The sub-frames 62, as illustrated in Figs. 9, 11 and 14, are pivotally secured at the rear and head of the bed at the points 64.

The sub-frames 62 are adapted to occupy positions overlying and resting upon the main spring section, as illustrated in Figs. 9 and 11, and lower extended positions, as shown in Fig. 6, to increase the size of the bed.

The sub-frames 62, when in extended positions are supported by struts 65 arranged at the opposite ends of each of the sub-frames.

The struts 65 comprise bars pivoted at one end to the ends of the sub-frames 62 and secured at the other end to elements 66, see Figs. 7 and 11, secured within and movable along slots in the inner sides of the head and foot bars 37 and 43 respectively.

This slotted connection between the struts 65 and the head and foot bars provides for the movement of the struts when the sub-frames 62 are folded over on the main springs.

The mattress used with the bed consists of two longitudinal sections 67.

Each of the mattress sections have a width and length of the main spring section, while the two together, when laid side by side, cover the main springs, as well as the extended sub-frames 62.

When it is desired to fold the bed up in preparation for turning it up into the cabinet, the two mattress sections 67 are placed one on top of another, and after the sub-frames 62 are folded inwardly, are placed on top of the sub-frames, as shown in Fig. 5.

As a counterbalance for the bed to reduce the weight of the bed when it is raised or lowered and also to maintain it in the elevated position within the cabinet, I provide a spring 68, which is attached to the top of the rear head bar 37 and to the bottom of the cabinet, as shown in Fig. 5.

It will be apparent that the cabinet may house numerous other appliances of household use, and may be modified considerably without departure from the essential features of the invention.

The invention claimed is:—

1. In a folding bed, the combination with head and foot frames, of springs attached to said frames, side bars having offset ends pivotally secured in the respective frames, said side bars being movable into planes paralleling the plane of the springs and into planes at right angles to the said plane of the springs, means for swinging the bed into an elevated or substantially vertical position and for lowering the bed into a horizontal or operative position, and means for automatically moving the said side bars from a plane paralleling the plane of the springs when the bed is elevated to a plane at right angles to the plane of the springs when the bed is swung to the horizontal position.

2. A folding bed comprising a frame including head and foot frames, and longitudinal side bars having offset ends pivotally secured in said head and foot frames respectively springs held in said frames, a horizontal pivotal mounting for the frame at one end thereof, legs to support the frame in a horizontal position at the opposite end and adapted to fold down against the said frame when the latter is elevated on its pivot, and means interconnecting the legs with the said side bars whereby as the legs are folded inwardly the bars are swung from a plane substantially perpendicular to the springs to a plane substantially parallel thereto.

3. A folding bed comprising a frame including head and foot frames and longitudinal side bars having offset ends pivotally secured in said head and foot frames respectively, springs held in said frames, a horizontal pivotal mounting for the frame at one end thereof, legs to support the frame in a horizontal position at the opposite end and adapted to fold down against the said frame when the latter is elevated on its pivot, means interconnecting the legs with the said side bars whereby as the legs are folded inwardly, the bars are swung from a plane substantially perpendicular to the springs to a plane substantially parallel thereto, and means for automatically moving the legs from the suspended position when the bed is in the elevated position to the vertical or frame-supporting position when the frame is lowered to the horizontal position and vice versa.

4. A folding bed comprising a frame including head and foot frames and longitudinal side bars having offset ends pivotally secured in said head and foot frames respectively, springs held in said frames, a horizontal pivotal mounting for the frame at one end thereof, legs to support the frame in a horizontal position at the opposite end and adapted to fold down against the said frame when the latter is elevated on its pivot, and links connecting the legs with the side bars and having a universal connection with each whereby they move together from a folded position when the bed is elevated to an extended or operative position when the bed is lowered.

5. In a folding bed, the combination with a frame, of a spring supported by the frame, a sub-frame hinged to the main frame at each side and adapted to be folded either to positions overlying the main frame or extending transversely therefrom as continuations, springs carried by said sub-frames, a head-bar and a foot-bar rigidly mounted on said frame, a slot in each of said bars, a strut pivotally secured to each end of each of the sub-frames, and an element secured and slidable along said slots and secured to the outer ends of each of the struts.

FREDERICK B. KAUFMAN.